US008172688B2

(12) United States Patent
Cole

(10) Patent No.: US 8,172,688 B2
(45) Date of Patent: May 8, 2012

(54) MODULAR GAMING MACHINE

(76) Inventor: Joseph W. Cole, Las Vegas, NV (US)

(*) Notice: Subject to any disclaimer, the term of this patent is extended or adjusted under 35 U.S.C. 154(b) by 0 days.

(21) Appl. No.: 12/931,822

(22) Filed: Feb. 11, 2011

(65) Prior Publication Data

US 2011/0159954 A1 Jun. 30, 2011

Related U.S. Application Data

(63) Continuation of application No. 11/595,835, filed on Nov. 9, 2006, now Pat. No. 7,905,783.

(51) Int. Cl.
*A63F 13/00* (2006.01)

(52) U.S. Cl. ................................ 463/46; 463/16; 463/31

(58) Field of Classification Search .................... 463/31, 463/46
See application file for complete search history.

(56) References Cited

U.S. PATENT DOCUMENTS

| | | | |
|---|---|---|---|
| 5,681,220 | A | 10/1997 | Bertram |
| 5,813,914 | A | 9/1998 | McKay et al. |
| D403,363 | S | 12/1998 | McGahn et al. |
| D404,436 | S | 1/1999 | McGahn et al. |
| D416,054 | S | 11/1999 | McGahn et al. |
| 6,135,884 | A | 10/2000 | Hedrick et al. |
| D451,150 | S | 11/2001 | Hedrick et al. |
| D451,151 | S | 11/2001 | Hedrick et al. |
| D451,152 | S | 11/2001 | Hedrick et al. |
| 6,368,216 | B1 | 4/2002 | Hedrick et al. |
| 6,820,875 | B1 | 11/2004 | Hedrick et al. |
| 2001/0048587 | A1 | 12/2001 | Yim |
| 2004/0018870 | A1 | 1/2004 | Cole |
| 2004/0121645 | A1 | 6/2004 | Postrel |
| 2005/0064942 | A1 | 3/2005 | Hedrick et al. |
| 2005/0202879 | A1 | 9/2005 | Hussaini et al. |
| 2005/0207100 | A1 | 9/2005 | Heckerman |
| 2005/0215325 | A1 | 9/2005 | Nguyen et al. |
| 2006/0073900 | A1 | 4/2006 | Cole |
| 2006/0154732 | A1 | 7/2006 | Tastad |
| 2006/0183544 | A1 | 8/2006 | Okada |
| 2009/0209324 | A1 | 8/2009 | Graf |

*Primary Examiner* — Paul A D'Agostino
*Assistant Examiner* — Ankit Doshi
(74) *Attorney, Agent, or Firm* — Weide & Miller, Ltd.

(57) ABSTRACT

A gaming machine has a first gaming device component and a second display device component and is particularly suited to presentation of wagering games. The gaming device is a first housing with associated player input devices and a game controller. The display device has a second housing with at least one game information display. The display device may be mounted to the gaming device to create a unitary device, or it may be mounted or set apart from the gaming device. The display device may also be connected to the gaming device in a number of orientations to create different gaming machine configurations. The display device also supports various display configurations, such as video displays and spinning reels.

8 Claims, 8 Drawing Sheets

MODULAR GAMING MACHINE

This application claims the benefit of and is a continuation of U.S. patent application Ser. No. 11/595,835, filed Nov. 9, 2006, now U.S. Pat. No. 7,905,783.

FIELD OF THE INVENTION

The present invention relates to a configuration of a gaming machine.

BACKGROUND OF THE INVENTION

Gaming machines utilized to present wagering games have been developed in a wide variety of configurations. The most common gaming machine configuration is the "upright" machine. This machine comprises a housing which has a front which faces the player. Towards the top is generally located one spinning reels or a video display. Below that is located one or more player buttons. At the bottom of the machine is generally located a coin tray to which winnings may be dispensed. In this configuration, the upright machine is a fully assembled single unit.

Other configurations of gaming machines have been developed. For example, some gaming machines have been developed for play by seated players. These "console" type gaming machines generally have a base and a sloped front surface which contains the display(s), buttons and the like. Again, however, this machine is a single integrated unit. Additional gaming machine configurations include bar-top units (which generally have a housing which fits in a support surface and a generally planar top surface which faces upwardly and contains the display(s).

There are a number of drawbacks relating to these gaming machines. In general, each gaming machine must be custom configured and manufactured. For example, if one game requires a particular display and another game requires reels, the entire configuration of the gaming machine may be different. This increases the costs of development and manufacture of the gaming machines.

SUMMARY OF THE INVENTION

The invention is a gaming machine. The gaming machine is particularly suited to presentation of wagering games.

In one embodiment, the gaming machine has a first gaming device component and a second display device component. The gaming device comprises a first housing with associated player input devices and a game controller. A door may be located at the front of the housing for controlling access to an interior space through an opening in the housing. In one embodiment, the door includes a console portion which supports the player input devices. The one or more gaming controllers may be located inside the housing of the gaming device. Preferably, the gaming device component or portion is incapable of comprising a gaming machine because it lacks one or more required game displays.

The display device comprises a second housing with at least one game information display. The game information display may comprise an electronic video display, one or more spinning reels or other devices or combinations thereof.

In one embodiment, the display device may be arranged into a variety of configurations by changing the orientation of the second housing or by changing the game information display(s) associated therewith.

The display device may be mounted to the gaming device to create a unitary device. The display device may also be mounted or set apart from the gaming device.

In one embodiment, at least one communication link is established between the gaming device and the display device, such as to permit the gaming controller to cause the display to display game information. The one or more communication links may be wired or wireless. In one embodiment, wires or cables extend through openings in the first and second housings. The second housing may include one or more removable panels to permit the display device to be arranged into a variety of positions while still facilitating the running of the wires or cables.

In accordance with the invention, basic gaming device and display device components may be arranged into a variety of gaming machine configurations. This provides great flexibility in gaming machine configuration with minimal manufacture/design costs.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a gaming machine. In one embodiment, the gaming machine is modular, having a gaming device portion and display portion. The gaming device portion may be mated with different display portions. The display portion may have a variety of different configurations. In one embodiment, the gaming device and a mating display portion need not be physically connected.

Figure 1:
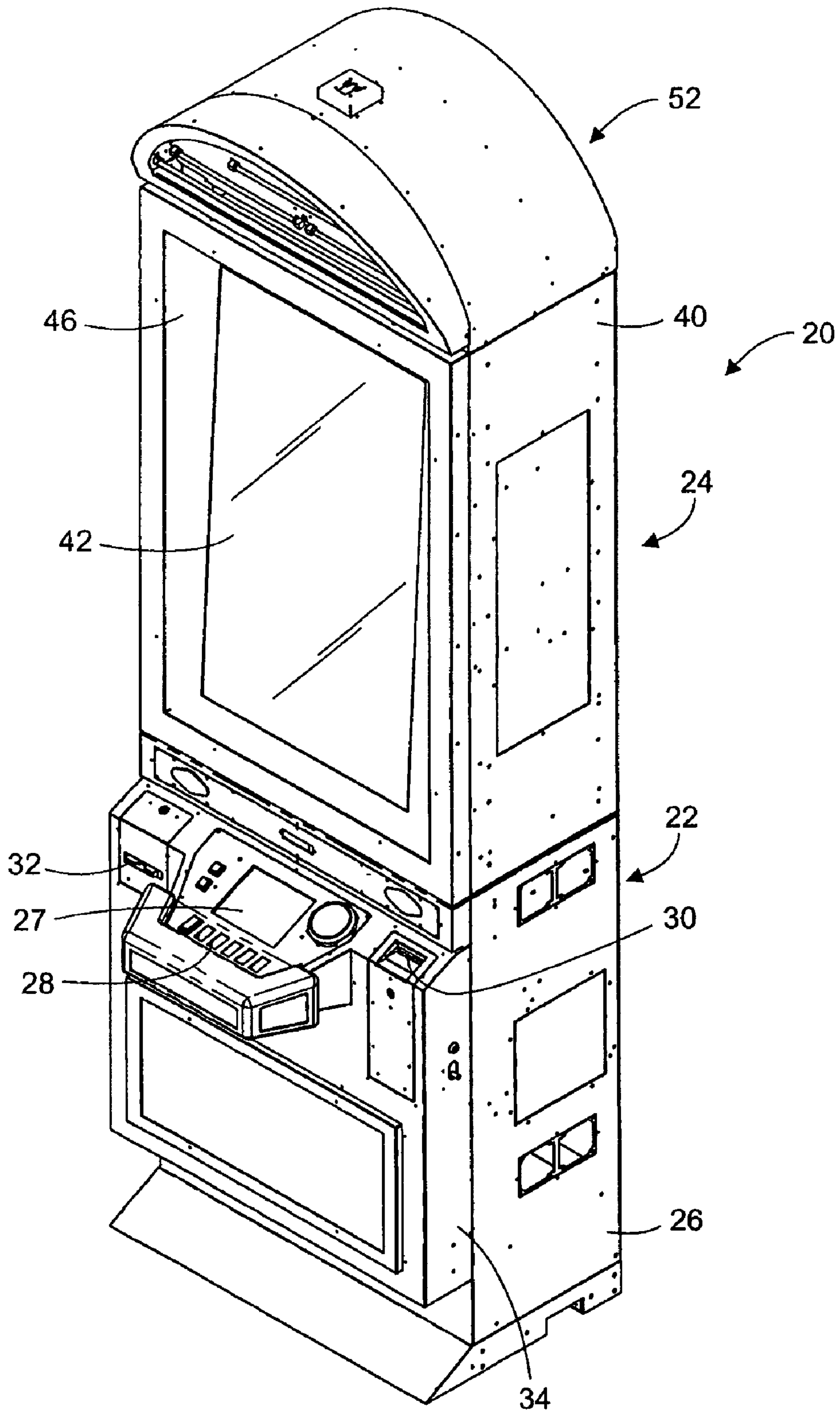
FIG. 1 is a perspective view of a gaming machine in accordance with the invention, the gaming machine arranged into a first configuration.

FIG. 1 illustrates a gaming machine 20 of the invention in a first configuration. As illustrated, the gaming machine 20 comprises a gaming device 22 and a display device 24.

In one embodiment, the gaming device 22 is configured as a base unit for the gaming machine 20. In such a configuration, as illustrated, the gaming device 22 may support the display device 24. As detailed below, however, this need not be the case.

Preferably, the gaming device 22 comprises a housing 26 for supporting and/or containing various components of the gaming machine 20. In general, the gaming device 22 preferably comprises a "control unit" of the gaming machine 20. Thus, in one embodiment, the gaming device 22 may include one or more controllers, such as game boards or processing devices. The one or more controllers may comprise a hardware, software (such as computer readable/executable program code), or both. The one or more controllers may be stand-alone, or they might be configured to receive game information from a remote location, such as a remotely located game server (in which case, the game controller may comprise a "slave" device). The control unit may include other devices, such as communication devices and ports, other input/output ports or connections, data storage or memory, and the like.

Preferably, the gaming device 22 supports one or more player input devices. For example, as illustrated, the gaming device 22 may support one or more touch input devices such as a touch screen 27 and one or more buttons 28. A player may utilize these player input devices to provide input to the gaming device 22.

As is known in the gaming machine art, the gaming device 22 may include a variety of other components for presenting one or more games. Preferably, the gaming machine 20 is configured to present one or more wagering games. Thus, the gaming device 22 includes one or more wager accepting devices. Such devices may include a currency acceptor 30 and/or other devices such as a coin acceptor, credit or smart card reader or the like.

As illustrated, the gaming device 22 may include other features, such as a media or ticket printer 32. The media printer 32 may print bar-coded or other tickets. Such tickets may include promotional material, have representative value or the like, as is known in the art.

Figure 4:
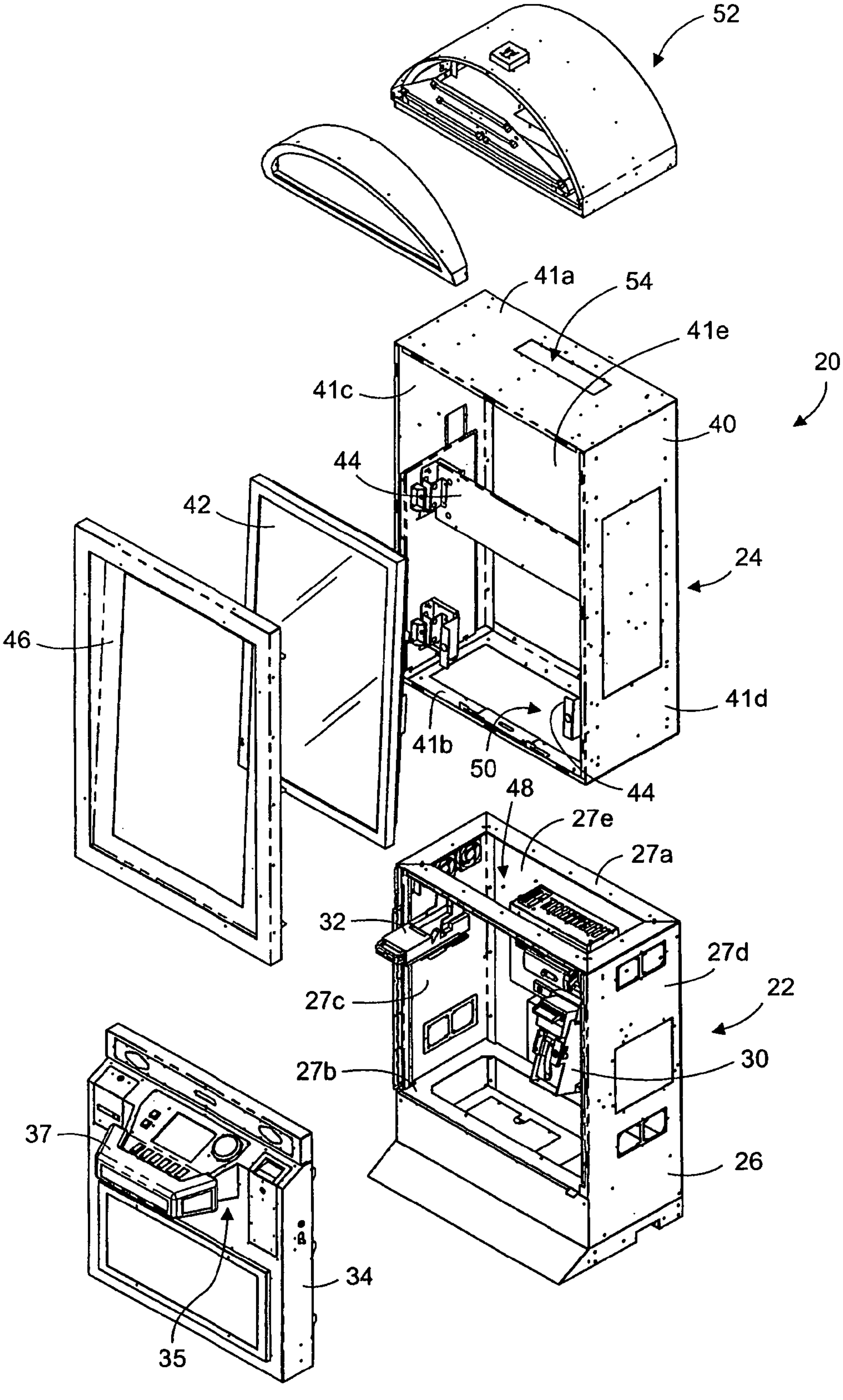
FIG. 4 is an exploded perspective view of the gaming machine illustrated in FIG. 1.

Referring to FIG. 4, in one embodiment, the housing 26 defines a generally closed interior space. Elements of the gaming device 22 such as the controller may be located in that interior space.

In one embodiment, the housing 26 has a top 27*a*, a bottom 27*b*, a pair of opposing sides 27*c,d*, and a rear or back 27*e*. At least a portion of a front of the housing 26 is open. As illustrated, a door 34 is mounted to the housing 26. The door 34 is movable between a first, closed position in which access to the interior of the housing through the front is generally prevented. The door is movable to a second, open position in which access to the interior of the housing through the front is generally permitted. The door 34 may be mounted to the housing 26 with hinges. The door 34 and housing 26 may include suitable locks and latches for selectively maintaining the door 34 in a closed, locked position and for releasing to the door to the open position.

As illustrated, the door 34 may be configured to cooperate with the housing 26 to mate various elements. For example, the door 34 may define a currency slot which is configured to mate with the currency acceptor 30 which is located within the interior of the housing 26.

As illustrated, the door 34 is configured to comprise the entire front of the gaming device 22. The door 34 may only close a portion of the front of the housing, there might be more than one door, or the like.

In one embodiment, the door 34 defines an outwardly extending console 35. Various of the player input devices, such as the touch-panel 26 and buttons 28, may be located at the console 35 and be supported thereby. In one embodiment, a bumper or pad 37 may be located at a front portion of the console 35. The bumper 37 may be padded to provide a resting area for a player.

In a preferred embodiment, the gaming device 22 portion of the gaming machine 20 is, by itself, not capable of presenting a game. In particular, the gaming device 22 does not include a game display for displaying game information to a player. The gaming machine 20 includes at least one display device 24 for that purpose.

Referring again to FIG. 1, the display device 24 preferably comprises a support for one or more displays. In one embodiment, the support comprises a housing 40. As illustrated in FIG. 1, the housing 40 may support one or more electronic video displays 42. The displays 42 may be of a variety of types now known or later developed. In one embodiment, the one or more displays 42 are thin panel displays, such as LCD, LED or plasma-type displays.

In general, the display 42 is configured to display game information to a player of the gaming machine 20. Preferably, data is received by the display 42 from the gaming device 22, such as from the controller, causing the display to display information such as text, graphics or the like. The display 42 may be used to display a variety of other information, such as advertising, game announcements, player tracking information, or other information.

Referring to FIG. 4, in one embodiment, the housing 40 has a top 41*a*, a bottom 41*b*, a pair of sides 41*c,d*, and a back or rear 41*e*, and defines an interior space. As illustrated, the housing 40 is generally rectangular in shape. The housing 40 might have a variety of configurations, including a variety of shapes and sizes. A front of the housing 40 is generally open. The one or more displays 42 are preferably located at the front of the housing 40 for viewing.

In an embodiment in which the display 42 is a electronic video display, the display 42 is preferably adjustably mounted to the housing 40. In one embodiment, the depth position of the display 42 (i.e. the position of the display 42 relative to the front and back of the housing 40) may be adjusted. In one embodiment, the angular position of the display 42 relative to the housing 40 may be adjusted. For example, the position of the display 42 relative to a horizontal axis (i.e. the forward or back "tilt") may be adjusted.

In one embodiment, one or more brackets 44 are mounted to the housing 40 and are configured to mount the display 42. The positions of one or more of the brackets 44 may be moved, such as forward or back relative to the sides of the housing 40, and/or angularly, to permit the position of the display 42 to be adjusted.

In the embodiment illustrated, the display 42 is mounted at the front of the housing 40 and substantially fills that open portion of the housing. A frame or bezel 46 may be located in front of the display 42. The bezel 46 preferably has a central opening through which the display 42 may be viewed. The bezel 46 thus defines a frame about the periphery of the display 42. The bezel 46 is preferably connected to the housing 40.

As indicated above, display 42 is preferably configured to display game information as controlled by the controller of the gaming device 22. In one embodiment, one or more communication links are thus provided between the display 42 and the gaming device 22. In one embodiment, those links may be wireless. In another embodiment, however, they are wired. In that configuration, one or more wires or cables may extend from the gaming device 22 to the display 42.

In one embodiment, to facilitate routing of wires or cables and the like, various apertures may be provided in the gaming device 22 and display device 24. In one embodiment, those apertures may be revealed by removing one or more panels or other portions of the housing 40. The panels or portions might be "pre-punched" so that they remain a portion of the housing 40 until it is desired to remove them. At that time, however, the panel may easily be removed without re-fabricating the housing 40. In a preferred embodiment, the various panels are part of the basic design of the housing 40, so that when the gaming machine 20 is later assembled, it can be assembled into any desired configuration.

For example, referring to FIG. 4, to facilitate routing of these wires between the gaming device 22 and display device 24, an aperture 48 may be defined in the top 27*a* of the housing 26 of the gaming device 22, and a corresponding aperture 50 may be defined in the bottom 41*b* of the housing 40 of the display device 24. Either or both apertures 48,50 may be revealed by removing a panel or punching out or removing a portion of a wall of the corresponding housings 26,40.

Figure 3:
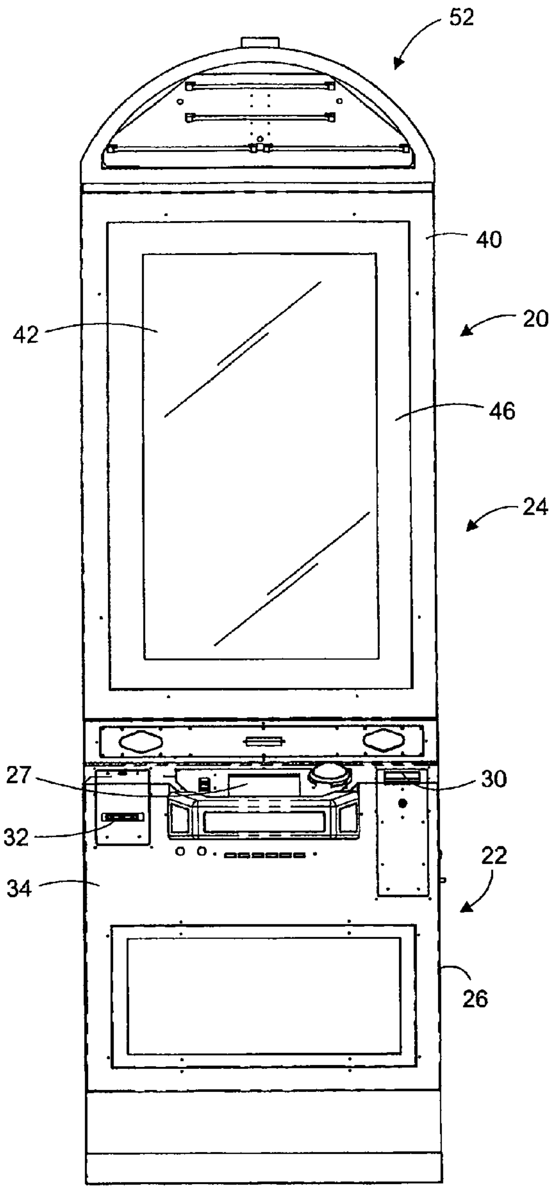
FIG. 3 is a front view of the gaming machine illustrated in FIG. 1.
Figure 2:
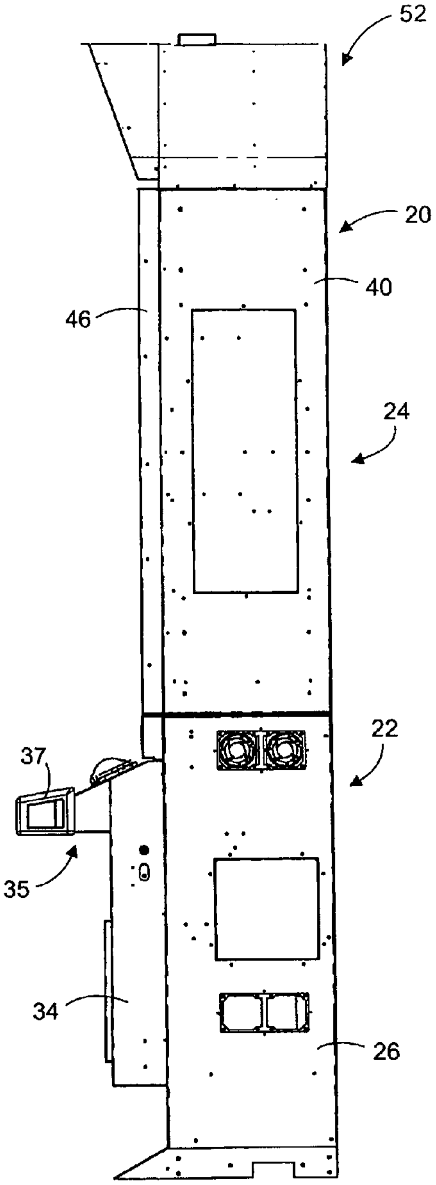
FIG. 2 is a side view of the gaming machine illustrated in FIG. 1.

The particular location of the one or more apertures may vary. The locations illustrated in FIG. 4 are particularly advantageous when the display device 24 is mounted on top of the gaming device 22, as illustrated in FIGS. 1-3. As detailed below, the display device and gaming device of the gaming machine of the invention may be arranged in other configurations, and in such configurations, the apertures may be located elsewhere.

Referring again to FIG. 4, the gaming machine 20 may include a top box 52. The top box 52 may be of a variety of configuration. In the embodiment illustrated, the top box 52 comprises a body or housing which defines an interior area. One or more lights are preferably located in that area. A covering, such as a screening glass may be located over an open portion of the body, so that it is backlit. The screening glass might be printed with text and/or graphics, such as to advertise the gaming machine.

In one embodiment, the top box 52 is configured to be mounted to the display device 22. As illustrated, the top box 52 has a generally planar bottom surface corresponding to the top 41*a* of the housing 40 of the display device 24. The top box 52 may be fastened to the housing 40 of the display device 42.

In order to power the top box 52, one or more wires or cables may run from the display device 24 or gaming device 22. In an embodiment where the top box 52 is mounted to the top of the housing 40 of the display device 24, one or more apertures may be located in the bottom of the top box 52 and in the top of the housing 40, for that purpose. As illustrated in FIG. 4, in one embodiment, an aperture 54 is defined in the top 41*a* of the housing 40. Once again, this aperture 54 may be revealed by removing a panel or portion of the housing 40.

In a preferred embodiment of the invention, the gaming machine 20 can have a variety of configurations. As illustrated in FIG. 1, the housing 40 of the display device 24 is oriented so that the sides 41*b,c* are vertically extending (which in the configuration illustrated, causes the longest dimension of the display device 24 to be oriented in the vertical direction). In this configuration, the video display 42 is similarly oriented.

As illustrated in FIGS. 1 and 3, the width of the housing 40 of the display device 24 from side 41*c* to side 41*d* , may be approximately the same as the width of the housing 26 of the gaming device 22 from side 27*c* to side 27*d*. In this manner, when the display device 24 is mounted to the gaming device 22 in the manner illustrated, the gaming machine 20 appears to be a single element or unit. Similarly, the depth of the housing 40 of the display device 24 and the depth of the housing 26 of the gaming device 22 may be approximately the same, as illustrated in FIG. 2.

Referring to FIGS. 5-8, the gaming device 22 and display device 24 may be arranged into other configurations. As illustrated therein, the display device 24 may be oriented perpendicular to the configuration illustrated in FIGS. 1-4. In particular, one side 41*c* of the housing 40 of the display device 24 may be positioned at the top 27*a* of the housing 26 of the gaming device 26 (so that the sides 41*c,d* of the housing 40 of the display device 24 extend generally horizontal, rather than vertical).

As illustrated, a portion or panel of the side 41*c* of the housing 40 may be removed to expose an aperture 56. This aperture 56 may be aligned with the aperture 48 in the top 27*a* of the housing 26 of the gaming device 26.

The one or more display supports or mounting brackets 44 may be moved to facilitate connection of the display 42 and associated bezel 46 in a generally "horizontal" orientation. For example, the brackets 44 may be moved from the interior of the sides 41*b,c* of the housing 40 to the interior of the top and bottom 41*a,b* of the housing 40.

Once again, the gaming machine 20 may include a top box 62. Because this top box 62 is associated with a side 41*b* of the housing 40 of the display device 24, rather than the top 41*a* (as illustrated in FIG. 4), the top box 62 may be of a larger size (in this case, width-wise dimension).

Figure 5:
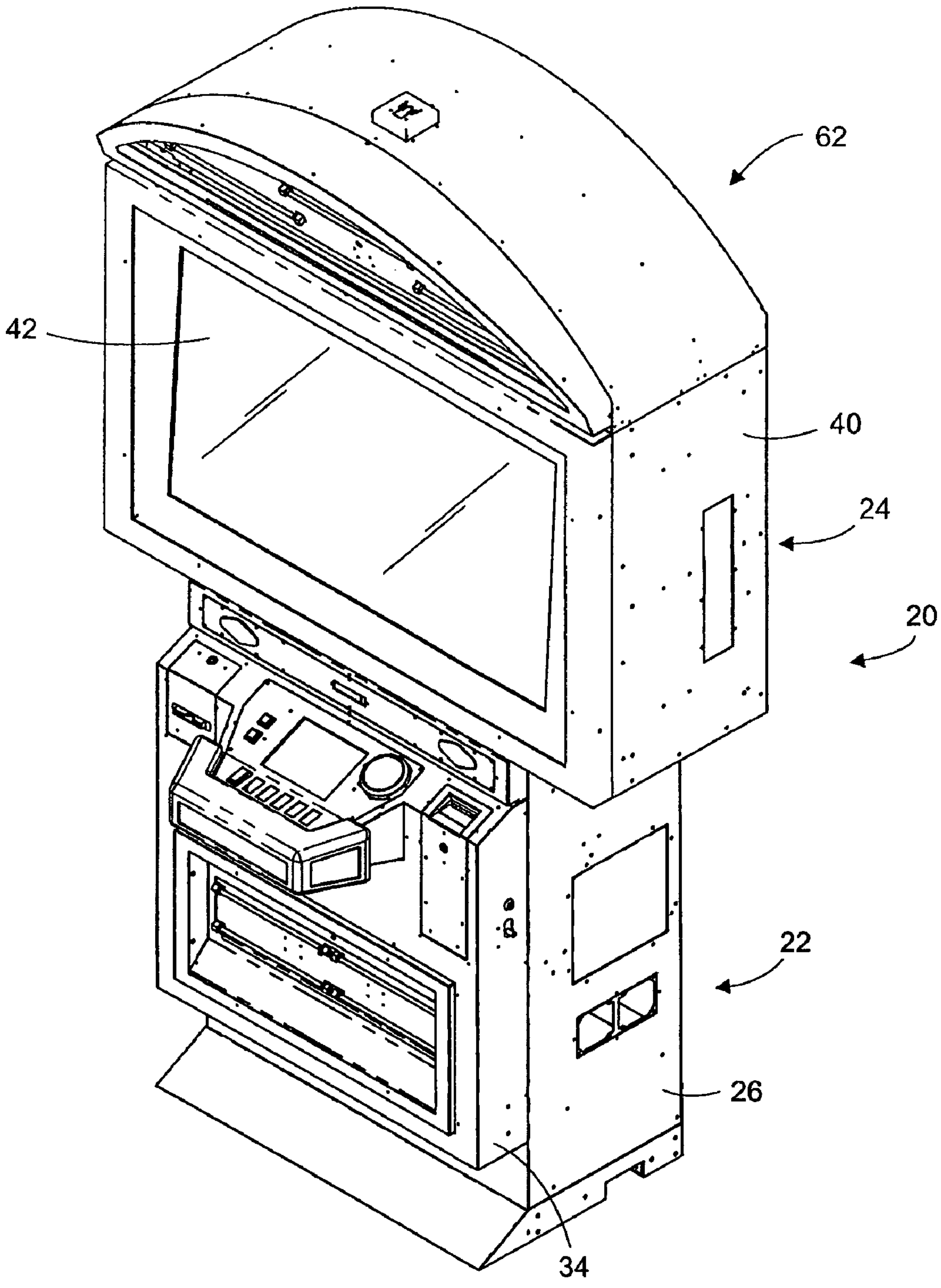
FIG. 5 is a perspective view of a gaming machine in accordance with the invention, the gaming machine arranged into a second configuration.
Figure 7:
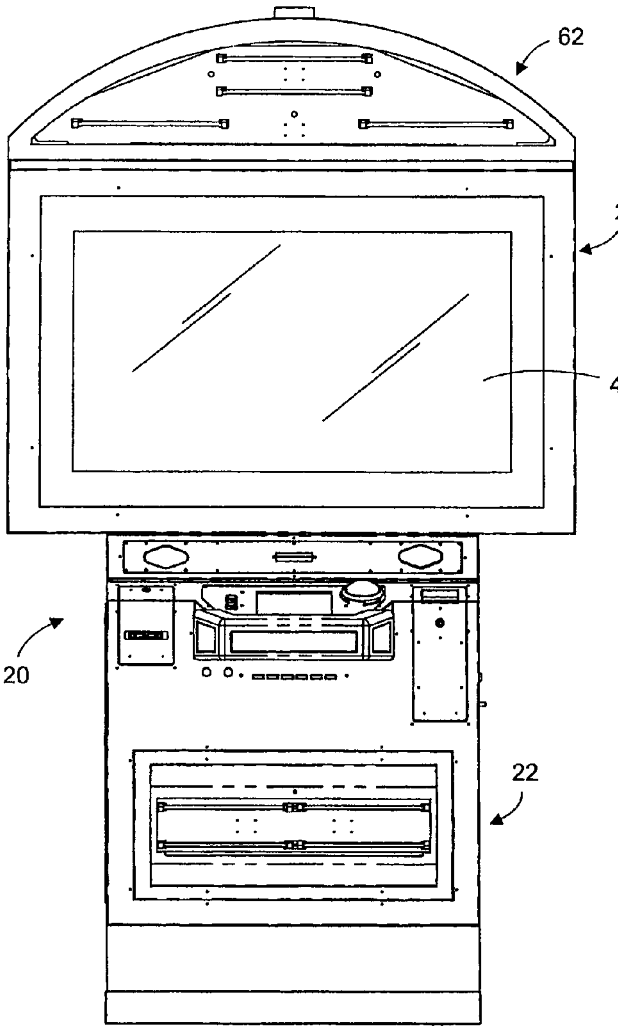
FIG. 7 is a front view of the gaming machine illustrated in FIG. 5.
Figure 6:
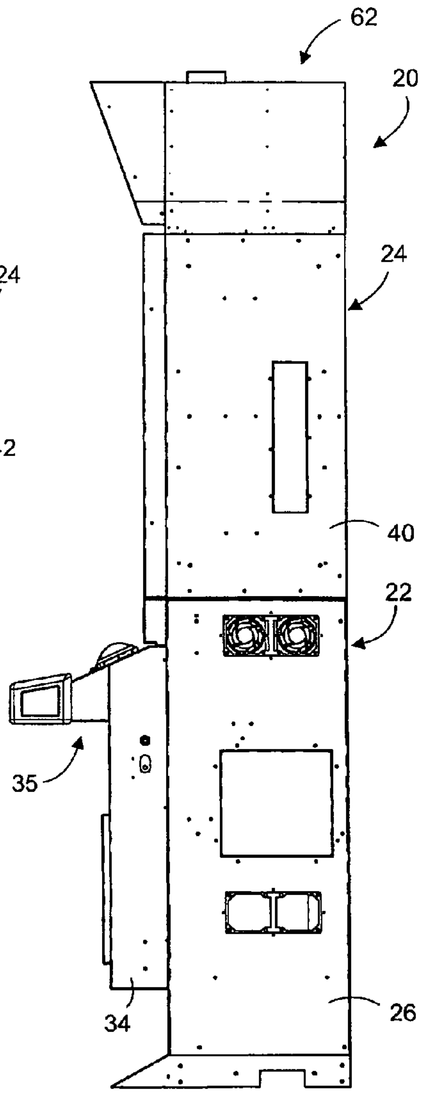
FIG. 6 is a side view of the gaming machine illustrated in FIG. 5.
Figure 8:
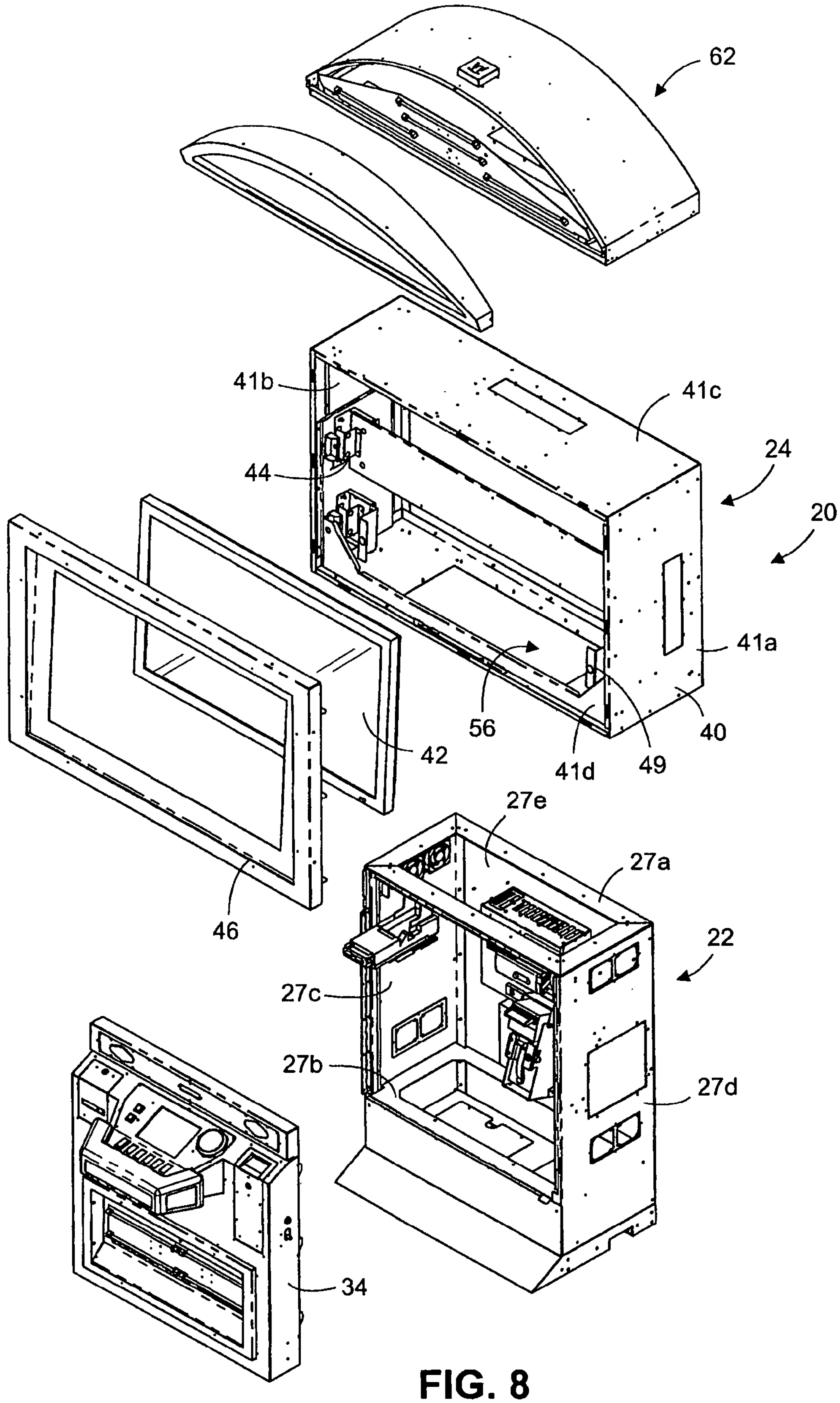
FIG. 8 is an exploded perspective view of the gaming machine illustrated in FIG. 5.

As best illustrated in FIG. 5, in this configuration, the longest dimension of the display device 24 and associated display 40 extend along a horizontal axis in this gaming machine 20 configuration.

Figure 9:
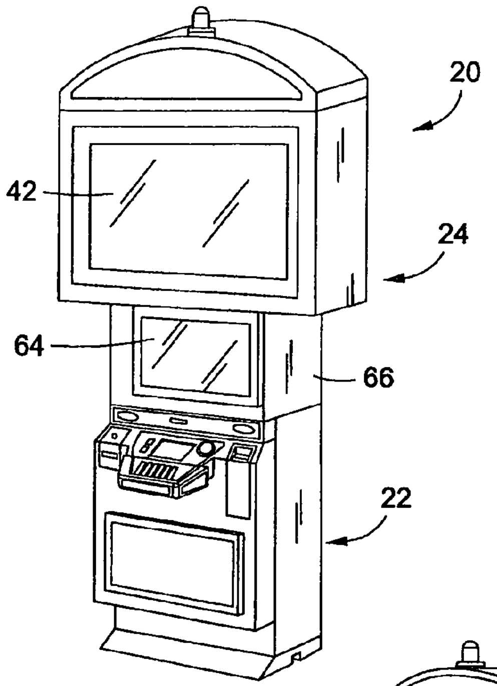
FIG. 9 is a perspective view of a gaming machine in accordance with the invention, the gaming machine arranged into a third configuration.

FIG. 9 illustrates yet another configuration of the gaming machine 20 of the present invention. In this configuration, the gaming machine 20 includes the gaming device 22 and display device 24, as well as an additional display 64.

As illustrated, the display device 24 is set above the gaming device 22. The display device 24 need not even be structurally connected to or supported by the gaming device 22. However, in the embodiment illustrated, the display device 24 is supported by a support 66. The support 66 might comprise, for example, a pair of legs. The legs may extend upwardly beyond the top of the gaming device 22. The support 66 may also comprise or include an enclosure, such as a housing.

The display device 24 might be positioned in various orientations. As illustrated, the display device 24 is positioned so that its sides extend generally horizontally. The display device 24 might be positioned vertically, as illustrated in FIG. 1.

As illustrated, the additional display 64 is positioned between the gaming device 22 and the display device 24. In the embodiment illustrated, the additional display 64 comprises an electronic video display, such as a LCD, LED or plasma display or the like. The additional display 64 may be mounted to the support 66, or directly to the gaming device 22 or display device 24. The additional display 64 may be configured to display a variety of information. As with the main display 42, the additional display 64 may display game or game-related information, such as main or secondary game information, advertising, player tracking information or the like.

Figure 10:
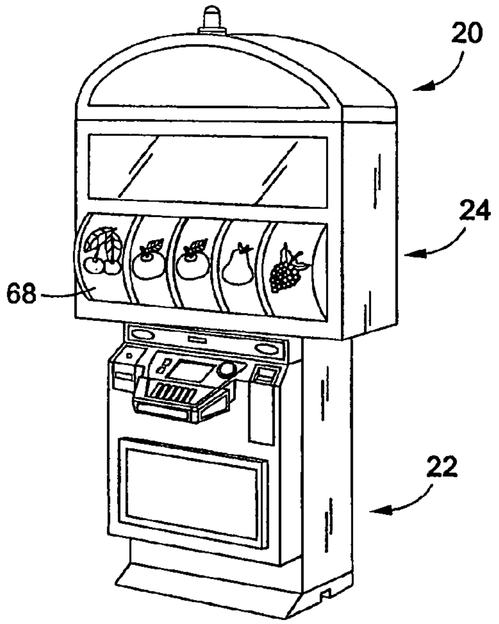
FIG. 10 is a perspective view of a gaming machine in accordance with the invention, the gaming machine arranged into a fourth configuration.

FIG. 10 illustrates yet another configuration of the gaming machine 20 of the present invention. In this configuration, the gaming machine 20 is arranged similar to that illustrated in FIGS. 5-8. In this configuration, however, the display 42 comprises a plurality of rotating reels 68. The exact number of the reels 68 may vary. The reels 68 may be controlled in a variety of fashions, such as by electronically controlled electric motors. The controller of the gaming device 22 may thus be in communication with the reels 68 (or at least their controllers). In one embodiment, the reels 68 may be utilized to present a slot-type game.

Figure 11:
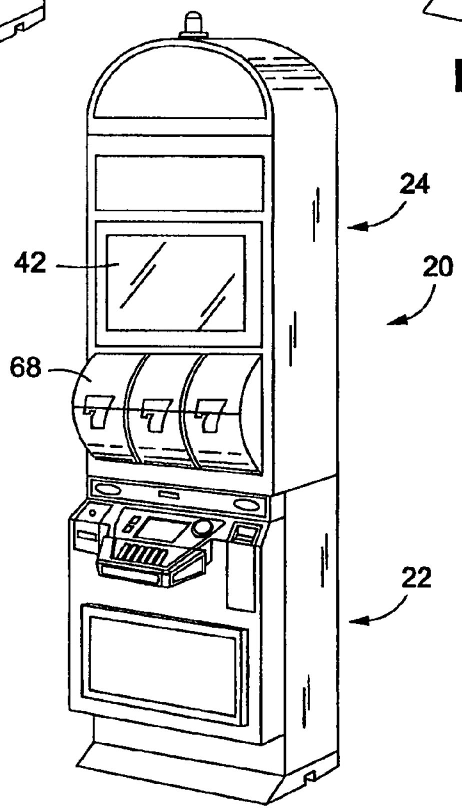
FIG. 11 is a perspective view of gaming machine in accordance with the invention, the gaming machine arranged into a fifth configuration.

FIG. 11 illustrates yet another configuration of the gaming machine 20 of the present invention. In this configuration, the gaming machine 20 is arranged similar to that illustrated in FIGS. 1-4. In this configuration, however, the display device 40 includes not only an electronic video display 42, but a plurality of spinning reels 68.

One aspect of the invention is a gaming machine comprising a gaming device and display device. Preferably, each portion of the gaming machine, alone, does not comprise a gaming machine capable of presenting a game. Instead, each portion is required to form a complete gaming machine.

In a preferred embodiment, the gaming device and display device are associated with two separate housings or enclosures. This permits the gaming device and display device to comprise two entirely separate elements. As illustrated in various of the figures, the gaming device and display device may be connected, such as by mounting the display device upon the gaming device. Preferably, the gaming device and display device may be associated with one another in a plurality of configurations. For example, the display device may be associated with the gaming device in at least two orientations. In this manner, a variety of gaming machine looks or styles may be created from the gaming device and display device.

Figure 12:
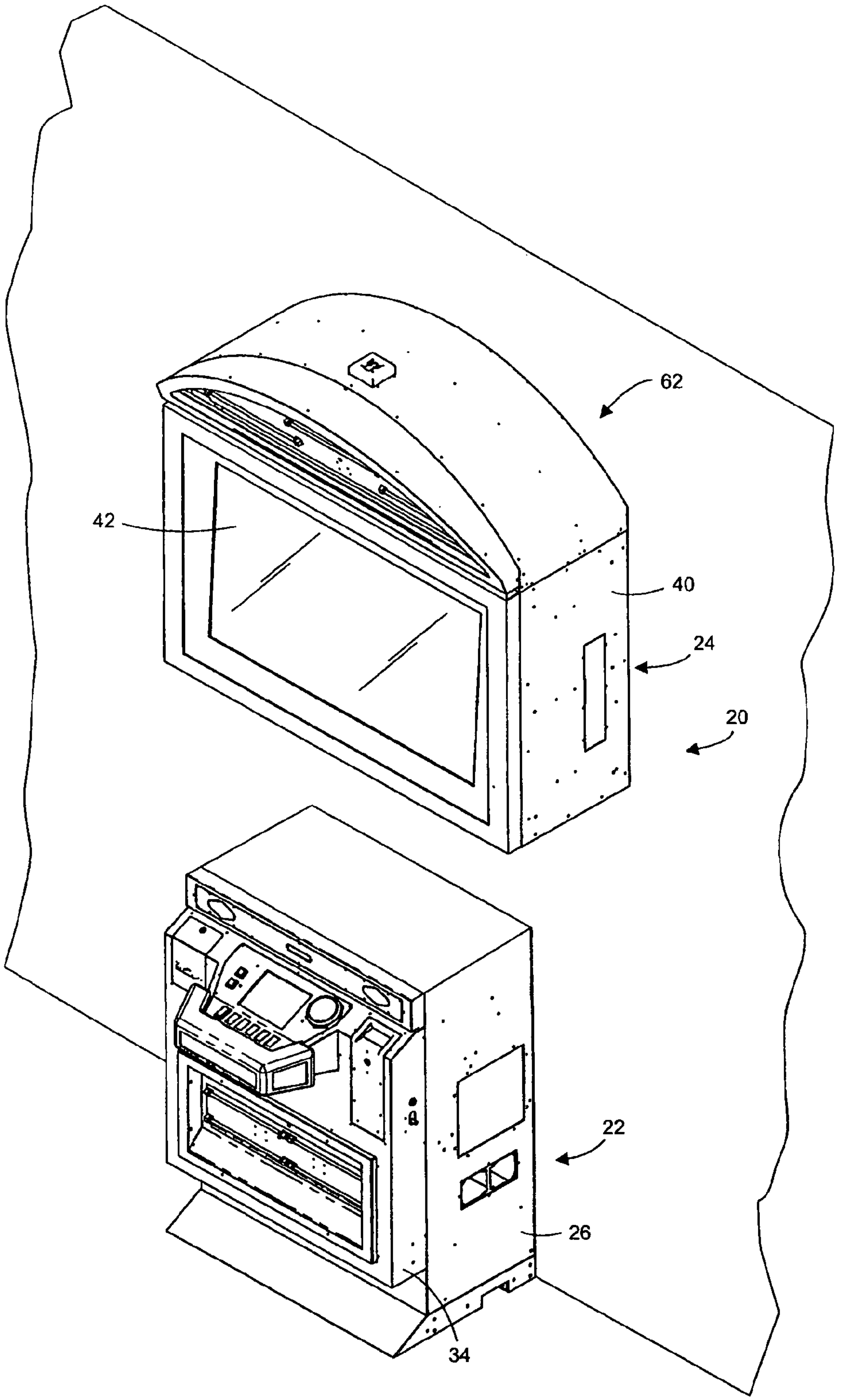
FIG. 12 illustrates a gaming machine having a display device which is mounted remote from a gaming device thereof.

In one embodiment, the display device need not be physically supported by (directly or indirectly), the gaming device. For example, the display device may be located remotely from the gaming device. The gaming device might be located on the floor of a casino. The display device might be mounted on an adjacent wall. FIG. 12 illustrates one such configuration in which the display device 24 is mounted to a wall remote from the gaming device 22 and the gaming device 22 communicates with the display device 24 wirelessly (as detailed above).

In one embodiment, the gaming machine might comprise more than one gaming device associated with a singe display device.

One aspect of the invention is a display device which may be arranged into a variety of configurations. As indicated above, the display device may be configured so that it can be oriented vertically or horizontally. The display device may include mounts which allows the position of one or more displays associated with the display device to be adjusted. Further, a variety of displays may be associated with the display device. For example, the display device may include a single electronic video display, multiple of such displays, spinning reels, and/or combinations thereof.

Because of the modular nature of the gaming machine, the gaming machine may have a basic construction which allows the gaming machine to be arranged into a variety of configurations. This has a number of benefits, including lowering the cost of manufacturing, while allowing user-flexibility in arranging the gaming machine into the best possible configuration. For example, one casino might desire to arrange the gaming machine as illustrated in FIG. 1 in order to minimize the width-wise space occupied by the gaming machine. Another casino might wish to arrange the gaming machine as illustrated in FIG. 4 because such a configuration is conducive to presentation of a particular game. In either case, the gaming machine has the same basic components.

The console of the gaming machine has a number of advantages. One advantage is the use of a touch-screen input. This reduces the number of inputs which would normally be required. For example, the single touch-screen might be utilized in place of several individual buttons. In addition, the touch-screen may present a variety of information. First, the touch-screen may present information regarding a particular input. For example, the screen might indicate "touch to spin" in order to accept a "spin reels" input from a player, or "select wager" in order to accept a wager input from a player. The touch-screen might also be utilized to present other information, however, such as wager information (credit available, for example), progressive jackpot amounts, advertising, player tracking information or other information.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming machine comprising: a gaming device, said gaming device comprising a first housing defining a generally closed interior space, said first housing having a pair of opposing sides, said first housing having a door located at a front thereof, said door selectively movable between open and closed positions relative to an opening leading to said interior space of said first housing, said gaming device including at least one player input device and at least one gaming controller configured to generate wagering game information for presentation by at least one main game display of a separate display device, said gaming device not including a main game display;

a display device, said display device comprising a second housing defining a generally closed interior space and at least one main game display configured to display wagering game information from said at least one gaming controller of said gaming device, said second housing located remote from said gaming device whereby said first housing of said gaming device and said second housing of said display device are not connected and said first housing does not support said second housing;

wherein said second housing has a pair of generally parallel first sides and a pair of generally parallel second sides, said first pair of sides being long than said second pair of sides, said display device configured to be arranged in at least two different orientations, a first orientation in which said first pair of sides form a top and a bottom of said display device and a second orientation in which said second pair of opposing sides form a top and a bottom of said display device; and at least one communication link between said at least one gaming controller and said at least one display, permitting said at least one display to display game information provided from said at least one gaming controller.

2. The gaming machine in accordance with claim 1 wherein said gaming device is supported by a floor and said display device is mounted on a wall above said gaming device.

3. The gaming machine in accordance with claim 1 wherein said at least one communication link comprises a wireless communication link.

4. The gaming machine in accordance with claim 1 wherein said gaming device further comprises a currency or coin acceptor.

5. A method of configuring a gaming machine comprising: providing a gaming device, said gaming device comprising a first housing defining a generally closed interior space, said first housing having a pair of opposing sides, said first housing having a door located at a front thereof, said door selectively movable between open and closed positions relative to an opening leading to said interior space of said first housing, said gaming device including at least one player input device and at least one gaming controller configured to generate wagering game information for presentation by at least one main game display of a separate display device, said gaming device not including a main game display;

providing a display device, said display device comprising a second housing defining a generally closed interior space and at least one main game display configured to display wagering game information from said at least one gaming controller of said gaming device, said second housing located remote from said gaming device whereby said first housing of said gaming device and said second housing of said display device are not connected and said first housing does not support said second housing; wherein said second housing has a pair of generally parallel first sides and a pair of generally parallel second sides, said first pair of sides being long than said second pair of sides, said display device configured to be arranged in at least two different orientations, a first orientation in which said first pair of sides form a top and a bottom of said display device and a second orientation in which said second pair of opposing sides form a top and a bottom of said display device;

mounting said display device to a support surface, whereby said display device is not connected to or supported by said gaming device and is located remotely from said gaming device; and establishing at least one communication link between said at least one gaming controller and said at least one display, permitting said at least one display to display game information provided from said at least one gaming controller.

6. The method in accordance with claim 5 wherein said support surface comprises a wall.

7. The method in accordance with claim 5 wherein said step of mounting comprises locating said display device on a wall above said gaming device.

8. The method in accordance with claim 5 wherein said at least one communication link comprises a wireless communication link.

* * * * *